Aug. 22, 1939.  O. SIEFERT ET AL  2,170,220
HAIR WAVING APPARATUS
Filed Jan. 21, 1936  3 Sheets-Sheet 1
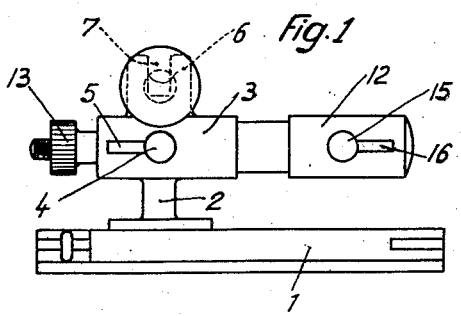
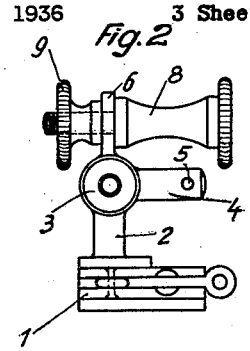
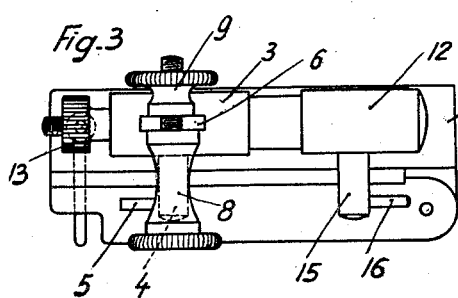
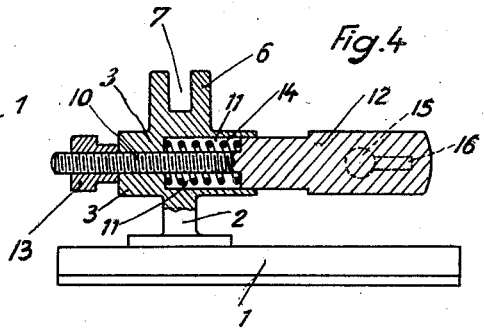
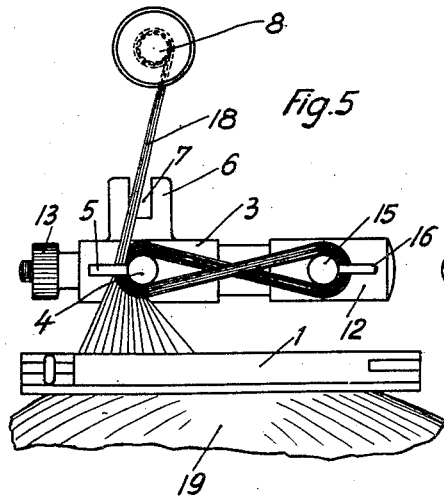
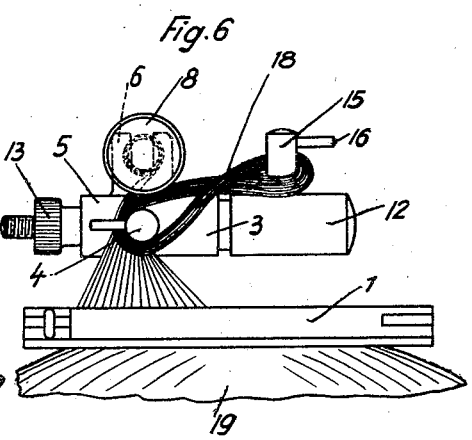
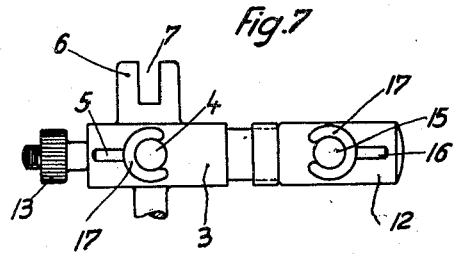
Inventors
OTTO SIEFERT
RICHARD PFENNIG
by Walter S. Bleistein
ATTORNEY Aug. 22, 1939.                    O. SIEFERT ET AL                    2,170,220
                                HAIR WAVING APPARATUS
                              Filed Jan. 21, 1936        3 Sheets—Sheet 2
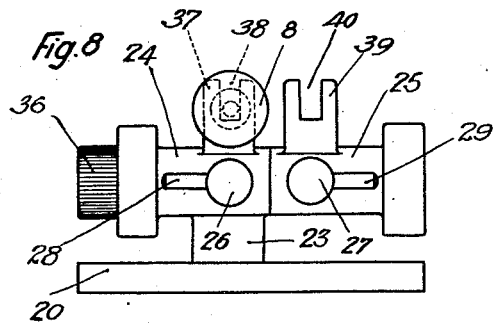
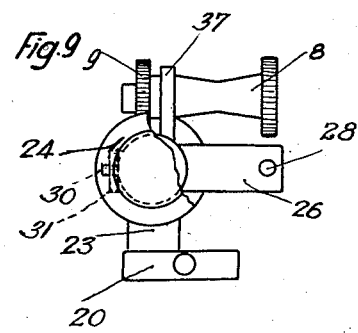
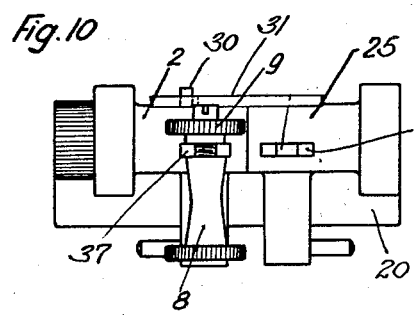
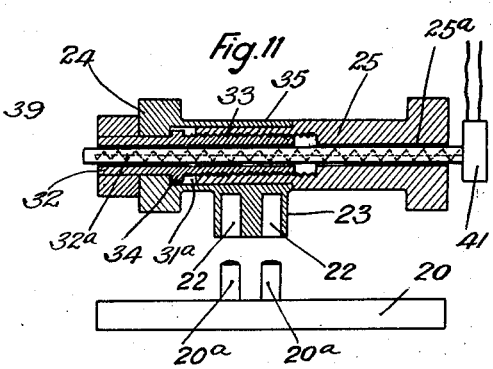
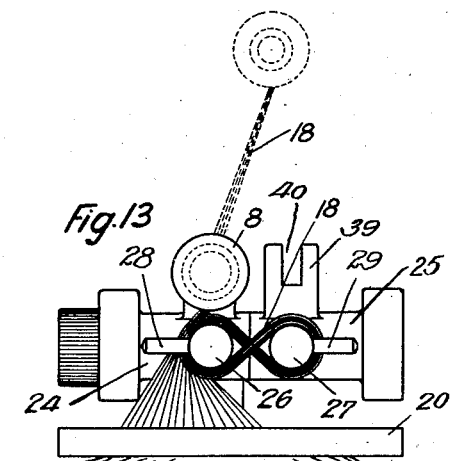
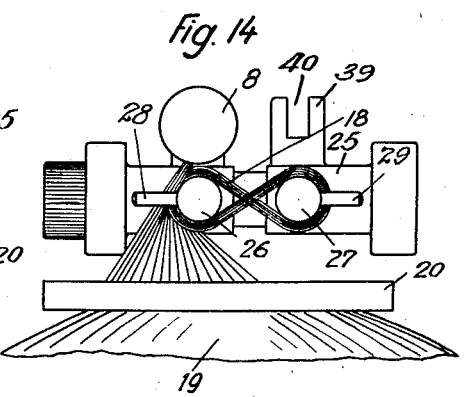
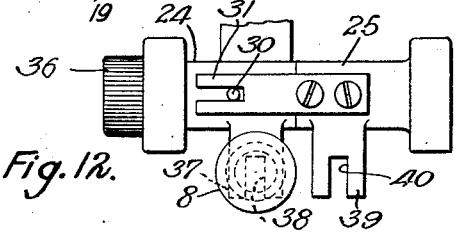
Inventors
OTTO SIEFERT
RICHARD PFENNIG
by Walter S. Bleistein
ATTORNEY Aug. 22, 1939.   O. SIEFERT ET AL   2,170,220
HAIR WAVING APPARATUS
Filed Jan. 21, 1936   3 Sheets-Sheet 3
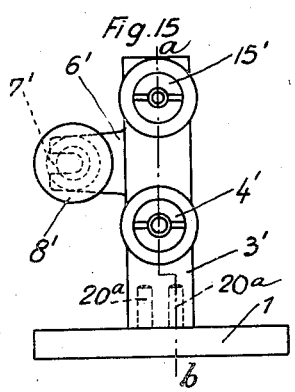
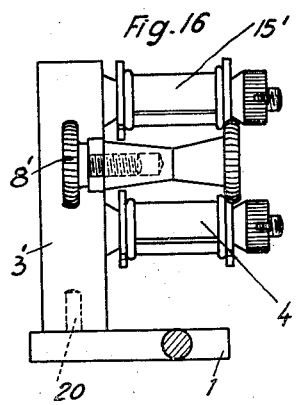
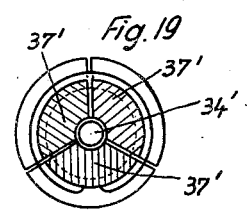
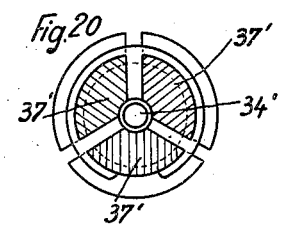
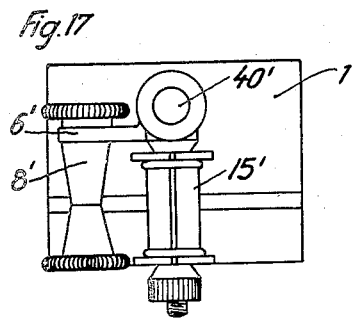
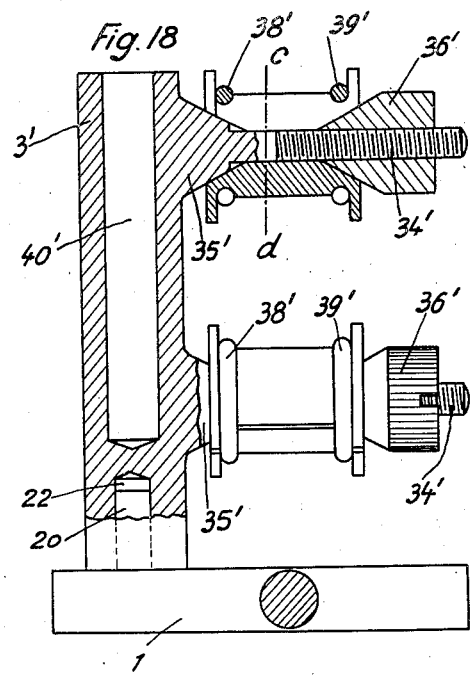
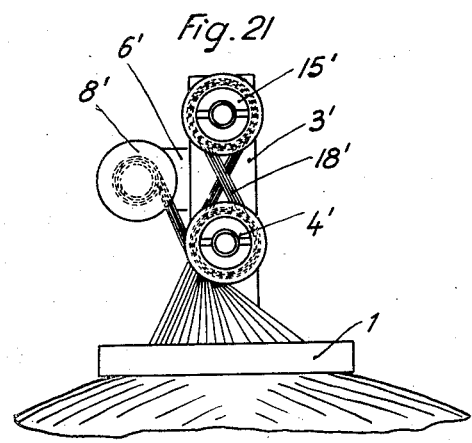
Inventors
OTTO SIEFERT
RICHARD PFENNIG
by Walter S. Bleistein
ATTORNEY Patented Aug. 22, 1939

2,170,220

UNITED STATES PATENT OFFICE 2,170,220

HAIR WAVING APPARATUS

Otto Siefert and Richard Pfennig, Berlin-Reinickendorf, Germany, assignors to Lawrence M. Gelb, New York, N. Y.

Application January 21, 1936, Serial No. 60,032
In Germany August 7, 1935

19 Claims. (Cl. 132—33)

This invention relates to a so-called "permanent" hair waving apparatus which can be heated in any desired manner.

In the apparatus according to the invention, the tress of hair which is parted in the usual manner with the aid of a hair clip or clasp is wound in figure-of-8 form about winders which are relatively displaceable or relatively rotatable or are adjustable in diameter in such a manner that, by the relative rotation or relative displacement of the two winders or by increasing the diameter of the winder, the length of the loop is increased and tension is exerted on the tress of hair. At the same time, the end of the tress of hair is preferably held and tensioned with the aid of a separate winder removably mounted in the hair waving apparatus.

Three forms of construction of a permanent hair waving apparatus in accordance with the invention are illustrated by way of example in the accompanying drawings, in which:

Figure 1 is a side elevation;
Figure 2 is an end elevation;
Figure 3 is a plan;
Figure 4 is a longitudinal section through Figure 1;
Figures 5 and 6 are side elevations similar to Figure 1 showing respectively the tress of hair being wound and completely wound and tensioned, and
Figure 7 shows a part of the apparatus shown in the side elevation in Figure 1 having means for increasing the amount of wave;
Figure 8 is a side elevation of another form of construction;
Figure 9 is an end elevation;
Figure 10 is a plan;
Figure 11 a longitudinal section through Figure 8;
Figure 12 is a side elevation opposite to Figure 8.
Figures 13 and 14 are side elevations similar to Figure 8 showing the hair being wound and completely wound and tensioned respectively.
Figure 15 shows a side elevation of a third form of construction;
Figure 16 is an end elevation;
Figure 17 is a plan;
Figure 18 is a longitudinal section on line $a$—$b$ of Figure 15 on a larger scale;
Figures 19 and 20 are sections on the line $c$—$d$ of Figure 18, Figure 19 showing the smallest diameter of the hair winder and Figure 20 the largest, and
Figure 21 is a side elevation similar to Figure 15 but showing the tresses of hair completely wound and tensioned.

Referring to the drawings, 1 indicates the usual hair aid or clip in which the tress of hair to be waved is clamped. The actual hair waving apparatus is fixed or removably mounted on one limb of the clip 1 by means of a foot 2. Adjacent this foot 2 and above it there is a horizontal rod-like part 3, which is provided on one side with a winder 4 having a retaining pin 5. Above the part 3 is an extension 6 having a slot 7 in which a winder 8 for the ends of the hair can be fixed at an angle of 90° to the part 3 by tightening the nut 9 which screws on to it. (See Figure 2.) The part 3 has two horizontal stepped bores 10 and 11 for the reception of a rod-like part 12, which with the aid of a nut 13 which is screwed on a threaded end of the part 12, can be fixed in the part 3 against the pressure of a spring 14 located in the bore 11. On the part 12 is mounted a winder 15 having a retaining pin 16 which is similar to the winder 4 on the part 3. The two winders may be of the same or different construction.

In order to form larger waves in the hair, additional parts 17, which enclose or partly enclose the winders 4 and 15 and can be fixed thereto in any suitable manner, may be employed.

The method of operation of the hair waving apparatus is as follows:

A tress of hair 18 is parted from the hair on the head 19 and is clamped by the clip 1. This tress is then prepared with permanent waving liquid and, starting from the root of the hair, is wound around the winders 4 and 15 in horizontal figure-of-8 form in such a manner that the end of the tress is directed upwardly (see Figure 5). The end of the tress of hair, beginning at the tip, is then wound on the winder 8 which, after the end of the tress has been wound on it, is placed in the slot 7 and is fixed in the slot by tightening the nut 9. The part 12 is next turned by hand through an angle of 90° relatively to the part 3 (see Figure 6), whereby a considerable tension is exerted on the portion of the tress between the winders 4 and 15. By adjusting the nut 13 on the part 12 the latter may be held in the relative position shown in Figure 6.

The heating of the hair is effected with the aid of any suitable heating device, for example by means of an electrical heating device.

In the form of construction of the hair waving apparatus shown in Figures 8 to 14, the hair clip by which the tress of hair 18 on the head 19 is clamped is indicated by the reference numeral 55

20. To one limb of the clip are fixed pins 20a which engage in corresponding holes 22 in the foot 23. On the horizontal rod-like part 24 and on the rod-like part 25, which is guided therein, are fixed winders 26 and 27 respectively having retaining pins 28 and 29 respectively in a similar manner as in the first example. The example illustrated in Figures 8–14 differs however from that shown in Figures 1–7 in that the part 25 is not revoluble in the part 24. On the contrary, any relative rotation between the two parts 24 and 25 is prevented by means of an extension 30 which is fixed on the part 24 and engages in a slotted or apertured extension 31 on the part 25, as shown more clearly in Figure 12.

The part 24 is provided with a stepped hole 31a into which is inserted from the open (right) end sleeve 32 externally threaded at 33 and shouldered at 34. The left end of the part 25 is reduced in diameter, as indicated at 35, to fit the hole 31a and threaded to receive the threads 33. A thumb ring 36 is secured to the sleeve 32 to hold the parts together and permit adjusting the part 25 axially of the part 24.

This form of construction also differs from that of the first example in that not only is an extension 37 having a slot 38 provided on the part 24, but also a corresponding extension 39 with a slot 40 is provided on the part 25 for the purpose of being able to fix the winder 8 for the ends of the hair either in the slot 38 or the slot 40 according to the length of the ends of the hair.

The heating of the hair waving apparatus can be effected, for example, with the aid of an electrical heating device 41 which is introduced in a bore 25a of the part 25 and the bore 32a of the sleeve 32 which is adjacent thereto. Instead of an electrical heating device obviously a metal bar can be employed which is inserted in heated condition into the bores.

The method of operation of the device shown in Figures 8–14 is as follows:

After the tress of hair 18 has been clamped in the clip 20 and prepared with permanent hair waving liquid the apparatus shown in Figure 11 is mounted on the clip. After this, just as in the first example, the tress of hair 18 is wound in a horizontal figure-of-8 winding around the two winders 26 and 27 and the ends of the tress are wound round the winder 8 which is then fixed either in the slot 38 or the slot 40 according to the length of the ends of the hair. For tensioning the tress of hair the threaded sleeve 32 is rotated relatively to the part 25 and, the part 24 moving with the sleeve 32, the winders 26 and 27 are thereby separated one from another (see Figure 14). The tress of hair 18 is then ready to be heated.

In the form of construction of the hair-waving apparatus according to Figures 15–21 the part 12 is omitted and the part 3′, as distinguished from the other two forms of construction, is not horizontal but is mounted vertically on the hair clip 1. Consequently in the form of construction according to Figures 15 and 21 the part 2 is also omitted and the pins 20a engage in corresponding bores 23 of the part 3′. Obviously, it would also be possible to arrange the part 3′ horizontally as in the two preceding constructional examples.

As in the two other constructional examples, the tress of hair 18′ is wound in a (now upright) figure-of-8 formation on the winders 4′ and 15′ and the winder 8′ for the ends, the latter winder being fixed in the slot 7′ of the extension 6′ arranged between the two winders 4′ and 15′.

The tensioning of the tress of hair 18′ is effected not by rotating or displacing the two hair winders 4′ and 15′ relatively to one another but by altering the diameters of the winders 4′ and 15′. For this purpose each of the two winders consists of a spindle 34′ having a conical part 35′ connected to or integral with the part 3′, of a correspondingly conically shaped nut 36′ which is screwed on the free end of the spindle 34′ in such a manner that the conical surface of the parts 35′ and 36′ face one another, and of two, three or more cheeks 37′ which are mounted around the conical surface of the parts 35′ and 36′ and are held in position with the aid of spring rings 38′, 39′.

The heating of the apparatus can be effected with the aid of a heating rod which is introduced into the bore 40′ of the part 3′.

The method of operation of the apparatus shown in Figures 15–21 is as follows: The winding of the tress of hair 18′ on the winders 4′ and 15′ and on the winder 8′ for the ends of the hair is effected in a similar manner as in the two examples previously described. Then the conical nuts 36′ are rotated on the parts 35′ so that the cheeks 37′ are pressed apart and thereby exert tension on the tress of hair 18′.

We claim:

1. Hair waving apparatus comprising two parts the parts carrying posts about which the hair to be waved is wound, means whereby the relative positions of the said parts can be varied so as to vary the spacing of the posts, and means for fixing the parts in position relatively to one another.

2. Hair waving apparatus comprising two parts the parts carrying posts about which the hair to be waved is wound, means whereby the distance between the posts may be increased so as to exert tension on the hair after it has been wound about the said posts, and means for securing the said parts in position relatively to one another.

3. Hair waving apparatus comprising two parts the parts carrying posts about which the hair to be waved is wound, means whereby the said parts may be rotated relatively one to the other, so as to exert tension on the hair after it has been wound about the posts, and means for securing the said parts in position relatively to one another.

4. Hair waving apparatus comprising a support, two laterally extending expansible posts carried thereby and about which the hair to be waved is wound, and means whereby the diameter of one or both the said posts may be increased, so as to exert tension on the hair after it has been wound round them.

5. Hair waving apparatus comprising a clip for gripping a tress of hair, a supporting member connected to said clip, a member movably carried by said support, means for fixing said movable member in position, and posts carried by the members for receiving the tress of hair wound thereon, the spacing of the posts being changed when the movable member is adjusted.

6. Hair waving apparatus comprising a sleeve, a hair receiving post on said sleeve, a rod revolubly mounted in said sleeve, a second hair receiving post on said rod, and means for fixing said rod relatively to said sleeve.

7. Hair waving apparatus comprising a sleeve, a hair receiving post on said sleeve, a rod revolubly mounted in said sleeve, a second post on said rod, means for fixing said rod relatively to said sleeve, a spool, and means for detachably connecting said spool to said sleeve or rod.

8. Hair waving apparatus comprising a sleeve, a hair receiving post on said sleeve, a spring disposed in said sleeve, a rod revolubly mounted in said sleeve and abutting against said spring, a second post on said rod, and means for retaining said rod in said sleeve against the action of the spring.

9. Hair waving apparatus in accordance with claim 4 wherein the posts comprise a plurality of cheeks, spring rings tending to press the cheeks together and conical parts by which the cheeks can be separated against the action of the spring rings, so as to increase the diameter of the posts.

10. Hair waving apparatus in accordance with claim 4 wherein the posts each comprise a spindle having a conical enlargement at one end, a plurality of cheeks mounted around said spindle, spring rings tending to hold the cheeks together, and a conical nut adapted to screw on said spindle and, in cooperation with said conical enlargement, to force said cheeks apart against the action of the spring rings.

11. Hair waving apparatus comprising a hollow sleeve, a hair receiving post thereon, a rod movable in said sleeve, a threaded bore in said rod, a threaded member engaging said threaded bore and adapted, when screwed on the sleeve, to displace the said hollow sleeve relatively to the said hollow rod.

12. Hair waving apparatus having a clip for holding a tress of hair, two-clip-supported, laterally projecting posts about which said hair may be wound in the configuration of a figure 8 loop of predetermined length, a spool about which the tip ends of said hair may be wound, spool-supporting means fixed with respect to one of the posts, and tensioning and expanding means whereby the figure 8 loop may be stretched without winding or unwinding the hair about either of the posts.

13. Hair waving apparatus as claimed in claim 12, wherein the tensioning and expanding means includes means for changing the spacing of the posts.

14. Hair waving apparatus as claimed in claim 12, wherein the tensioning and expanding means includes means to increase the diameter of at least one of the posts after the hair is wound thereon.

15. Hair waving apparatus as claimed in claim 12, wherein the posts are mounted on members one of which is relatively stationary relative to the clip, while the other member is adjustably carried by the first member.

16. Hair waving apparatus having a relatively stationary member, a relatively movable member carried thereby, a laterally extending post carried by each member and about which a tress of hair is adapted to be wound in the form of a figure 8, means for securing the tips of the hair to hold the same relatively immovable with respect to one of the posts, and means for shifting the relatively movable member to further space the posts whereby the hair may be subjected to tension.

17. Hair waving apparatus comprising a support, two posts carried thereby and about which a tress of hair may be wound to form a figure 8 loop of predetermined over all length, a spool to receive the ends of the hair of the tress after winding about the posts, means for securing the spool in fixed relation to one of the posts, and means acting on the posts for altering the length of the loop whereby tension may be applied to the wound hair.

18. Hair waving apparatus comprising a clip for gripping a tress of hair, a support connected to said clip, a member movable relative to said support, posts carried by said movable member and support and about which the tress of hair may be wound, means for fixing said movable member relatively to said support, a spool adapted to receive the ends of the tress of hair, and means for detachably connecting said spool in fixed relation to one of said posts.

19. Hair waving apparatus comprising a clip for holding a tress of hair, a supporting member connected to said clip, a post carried thereby and about which the hair to be waved is wound, a member movable relative to said supporting member, a second post on said movable member, means for securing said movable member in different positions relatively to said supporting member, a spool, and means for detachably securing said spool in fixed relation to one of the posts.

OTTO SIEFERT.
RICHARD PFENNIG.